(12) United States Patent
Lambert

(10) Patent No.: US 8,077,857 B1
(45) Date of Patent: Dec. 13, 2011

(54) PORTABLE SPEAKERPHONE DEVICE WITH SELECTIVE MIXING

(75) Inventor: David Lambert, South Jordan, UT (US)

(73) Assignee: ClearOne Communications, Inc., Salt Lake City, UT (US)

( * ) Notice: Subject to any disclaimer, the term of this patent is extended or adjusted under 35 U.S.C. 154(b) by 1204 days.

(21) Appl. No.: 11/686,280

(22) Filed: Mar. 14, 2007

(51) Int. Cl.
H04M 9/08 (2006.01)

(52) U.S. Cl. .............................. 379/406.02; 379/406.12

(58) Field of Classification Search ............... 379/93.21, 379/158, 202.01, 406.01–406.16, 3; 381/119, 381/71.1–71.14, 94.1–94.8; 370/286–292; 455/570
See application file for complete search history.

(56) References Cited

U.S. PATENT DOCUMENTS

| | | | |
|---|---|---|---|
| 4,360,712 A | 11/1982 | Horna | |
| 5,263,020 A | 11/1993 | Yatsuzuka et al. | |
| 5,477,534 A | 12/1995 | Kusano | |
| 5,577,097 A | 11/1996 | Meek | |
| 5,696,819 A | 12/1997 | Suizu et al. | |
| 5,848,146 A * | 12/1998 | Slattery | 379/406.01 |
| 5,933,495 A | 8/1999 | Oh | |
| 5,937,060 A | 8/1999 | Oh | |
| 6,192,126 B1 | 2/2001 | Koski | |
| 6,434,110 B1 * | 8/2002 | Hemkumar | 370/201 |
| 6,442,272 B1 * | 8/2002 | Osovets | 379/406.01 |
| 6,459,942 B1 | 10/2002 | Markow et al. | |
| 6,526,140 B1 | 2/2003 | Marchok et al. | |
| 6,654,463 B1 | 11/2003 | Leonidov et al. | |
| 6,738,358 B2 | 5/2004 | Bist et al. | |
| 6,744,884 B1 | 6/2004 | Bjarnason | |
| 6,768,796 B2 | 7/2004 | Lu | |
| 6,868,158 B2 * | 3/2005 | Takahashi et al. | 379/406.04 |
| 6,990,194 B2 * | 1/2006 | Mikesell et al. | 379/406.04 |
| 7,046,794 B2 | 5/2006 | Piket et al. | |
| 7,050,575 B1 | 5/2006 | Romesburg | |
| 7,099,458 B2 | 8/2006 | Piket et al. | |
| 7,764,783 B1 | 7/2010 | Pai et al. | |
| 7,912,211 B1 | 3/2011 | Lambert | |
| 2002/0061103 A1 | 5/2002 | Pehrsson | |
| 2003/0076947 A1 * | 4/2003 | Furuta et al. | 379/406.01 |
| 2003/0133565 A1 | 7/2003 | Chang et al. | |
| 2003/0206624 A1 | 11/2003 | Domer et al. | |
| 2004/0028217 A1 | 2/2004 | Ebenezer et al. | |
| 2004/0041902 A1 | 3/2004 | Washington | |
| 2004/0190701 A1 * | 9/2004 | Biage | 379/202.01 |
| 2008/0291260 A1 | 11/2008 | Dignan et al. | |

* cited by examiner

Primary Examiner — MD S Elahee
Assistant Examiner — Akelaw Teshale
(74) Attorney, Agent, or Firm — Matthew J. Booth & Associates, PLLC; Matthew J. Booth

(57) ABSTRACT

Disclosed herein are portable teleconferencing products that implement a doubletalk detector in a low frequency range or in a frequency range commensurate with the frequencies through which sound may be efficiently transferred between a speaker and a microphone through an enclosure. Also disclosed herein are teleconferencing systems that implement a secondary doubletalk detector, a non-presumptive doubletalk detector, a confirmatory doubletalk detector, and/or a false doubletalk detector, whereby echo cancellation coefficients may be better adapted after echo path changing events through the use of accelerated coefficient adaptation or half-duplex operation until adaptation is restored. Further disclosed herein are teleconferencing products that include more than one port for communicating with distant parties or a single party and a local source of audio material, whereby one distant party is prevented from being transmitted to it private audio from another party or another audio signal while permitting a local participant to hear the private audio. Detailed information on various example embodiments of the inventions are provided in the Detailed Description below, and the inventions are defined by the appended claims.

15 Claims, 8 Drawing Sheets

PORTABLE SPEAKERPHONE DEVICE WITH SELECTIVE MIXING

CROSS REFERENCE TO RELATED APPLICATIONS

The following applications share a common specification, Ser. No. 11/686,280 (filed 14 Mar. 2007), Ser. No. 11/686,266 (filed 14 Mar. 2007), and Ser. No. 11/686,250 (filed 14 Mar. 2007).

BACKGROUND

The claimed systems and methods relate generally to loudspeaker teleconferencing systems that utilize echo cancellation and full duplex operation with distant participants, and more particularly to teleconferencing systems that implement narrow-band doubletalk detectors, secondary modes of doubletalk detection and partial mixing of audio between two far-end participants or one far-end participant and a local audio source.

The reader is referred to the following U.S. patents for background information. U.S. Pat. No. 5,933,495 to Oh describes a subband acoustic echo canceller that includes the freezing of filter coefficients on detection of near-end speech. U.S. Pat. No. 5,937,060, also to Oh, describes a residual echo suppression system in connection with an echo canceller. U.S. Pat. No. 6,990,194 to Mikesell et al. describes the use of sub-banded voice activity detectors coupled to an echo cancelling circuit. All of these references are hereby incorporated by reference as background material for the description that proceeds below.

BRIEF SUMMARY

Disclosed herein are portable teleconferencing products that implement a doubletalk detector in a low frequency range or in a frequency range commensurate with the frequencies through which sound may be efficiently transferred between a speaker and a microphone through an enclosure. Also disclosed herein are teleconferencing systems that implement a secondary doubletalk detector, a non-presumptive doubletalk detector, a confirmatory doubletalk detector, and/or a false doubletalk detector, whereby echo cancellation coefficients may be better adapted after echo path changing events through the use of accelerated coefficient adaptation or half-duplex operation until adaptation is restored. Further disclosed herein are teleconferencing products that include more than one port for communicating with distant parties or a single party and a local source of audio material, whereby one distant party is prevented from being transmitted to it private audio from another party or another audio signal while permitting a local participant to hear the private audio. Detailed information on various example embodiments of the inventions are provided in the Detailed Description below, and the inventions are defined by the appended claims.

Figure 1:
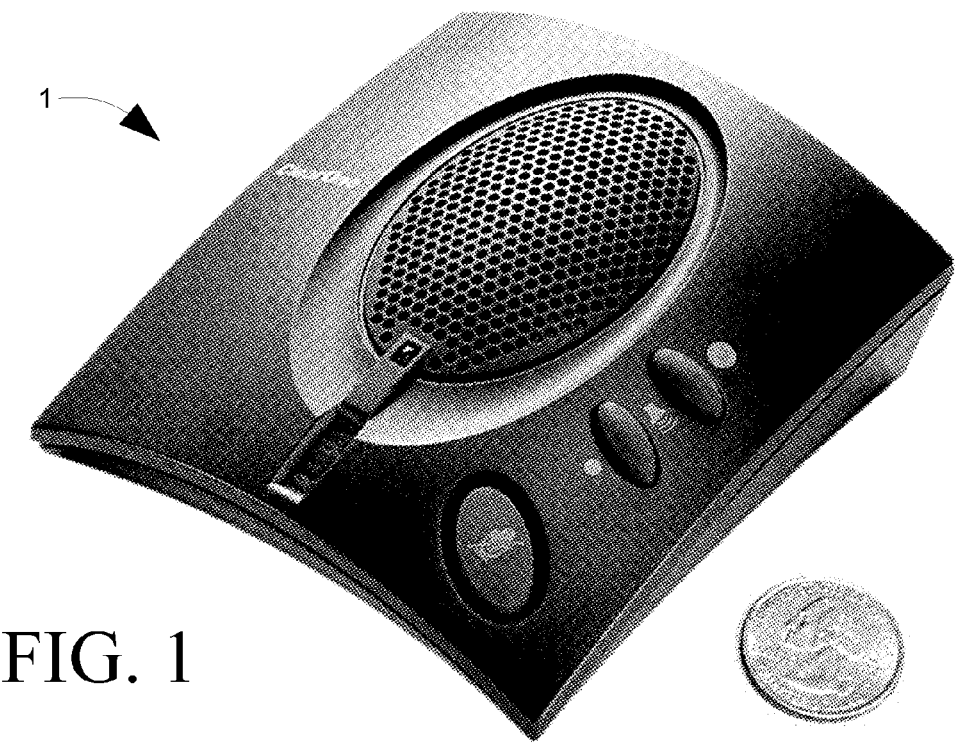
FIG. 1 shows an exemplary teleconferencing product in relation to a U.S. quarter.

Reference will now be made in detail to particular implementations of the various inventions described herein in their various aspects, examples of which are illustrated in the accompanying drawings and in the detailed description below.

DETAILED DESCRIPTION

Described herein are certain teleconferencing products for communicating between a local and one or more distant or far-end participants. Those products will typically include an enclosure, one or more microphones for picking up local sound or speech and one or more speakers for generating audio from an audio signal received from the one or more distant conferees. The speakers will be driven by or may be included in a sound producing circuit, for example a power amplifier, and the microphones by a microphone circuit, for example a preamplifier. These devices will include a full-duplex port, which is a transmitter and receiver channel in one bundle, however a full-duplex port can be fashioned from a separate transmitter and receiver channels. The teleconferencing products may or may not utilize frequency decomposition, which is the application of audio data processing in sub-bands. These products need not utilize frequency decomposition, but may rather process wide-band audio data if desired.

The products disclosed herein also include an echo canceller, which allow for increased audio quality in full-duplex operation by preventing certain echos from reaching a distant party. Some of the products utilize an echo canceller that includes a finite-impulse response (FIR) or infinite-impulse response (IIR) filter, which filters include a number of coefficients representing the sum of the echo paths in the environment of the product in operation. The echo canceller may produce an echo cancellation signal, which is a continuous signal that is either added to or subtracted from the signal received at the one or more microphones.

For those products implementing an FIR or IIR echo canceller, the coefficients are adapted or converged over a period of time where there is incoming audio from a distant participant but silence in the product's local vicinity. The adaptation of coefficients may be through a converger or adapter that applies an iterative method to arrive at an echo cancellation solution. Coefficient adaptation may be controlled such that those coefficients are adapted generally where there is a substantial far-end audio signal and no detected sound produced in the local environment.

A doubletalk detector may be included to discriminate between a condition of far-end audio only, and a condition of audio on the near and a far-end of the conversation which is called doubletalk. The doubletalk detector may track the conversation between conferees to identify appropriate times to engage coefficient adaptation.

In certain of the portable products, a speaker and microphone will be present in the same enclosure, and audio will be coupled directly between a speaker and a microphone. Those portable products may be quite small, sometimes small enough to place in a briefcase, purse or pocket. In those devices the speaker to microphone coupling may be especially great at certain frequencies or frequency bands, which property can be utilized to increase the reliability of a doubletalk detector. In the exemplary product described below, the preferred band of doubletalk detection is between about 125 Hz. and about 625 Hz.

Also in certain of the products disclosed is a secondary method of evaluating a doubletalk detector and/or an echo canceller. As the customary doubletalk detector relies on coefficient coherence with the existing echo paths, a change to the echo paths in the vicinity of the product may produce poor echo cancellation, and if the echo cancellation is seriously degraded coefficient adaptation will not occur because a doubletalk detector may cease to function. A secondary confirmatory doubletalk detector may be used to confirm the proper operation of a primary doubletalk detector, which may use differing frequency bands. A secondary doubletalk detector may indicate false doubletalk, or a failure to identify the absence of near-end audio in the presence of far-end audio, which may be indicated if doubletalk between the detectors is not contemporaneous or substantially similar as will be understood by one of ordinary skill in the art.

When and if false doubletalk is detected, a product may reset an included echo canceller, which may include resetting the filter coefficients, entering a period of accelerated adaptation or resetting to a power-on state. A state of half-duplex operation may be entered while confidence in the echo canceller or its coefficients is low, which may also occur after false doubletalk is detected. A non-presumptive method of doubletalk detection, as defined below, may be used to detect false doubletalk or act as a backup doubletalk detection method.

Some of the conferencing products disclosed herein include more than one communication port for communicating participants in more than one location. Others of the products may be connected to an audio signal source at the same time as a connection with a distant participant. A conferencing system utilizing echo cancellation may feed the audio between two distant participants to each other, otherwise they might not hear each other. Certain of the conferencing products disclosed herein can be configured or switched such that the audio from one participant is not transmitted to another, thereby permitting a partial private audio line from a distant participant to the local participants. By replacing a connection to a conferee with a connection to an audio source, which could be any source of audio including a playback device or a broadcast receiver, a local participant may listen to that audio source while not transmitting that audio to distant participants. The configuration may be by a physical, logical or a software switch, which can be implemented as a checkbox or other graphical control element. This effect may be one way, meaning that one party is private, or multi-way if it is desired to keep the speech of more than one party private from the others. The effect may be controllable, even during a conference, if it is desired to have a partially private conference for part of the time.

It is to be understood that certain substitutions and modifications may be made to the products described without departing from the disclosed and/or claimed inventions. For example, in today's signal processing equipment an audio signal may be represented as a stream of audio data, and these are synonymous herein to their respective analog and digital domains. Likewise, where an implementation is described as hardware, it can just as easily be made with software, and vice versa. An exemplary product is presented with features as described above, which may contain one implementation of the inventions described herein. Where a claimed invention is described with reference to any particular implementation, it is to be understood that this is merely for convenience of description and the inventions so described are not limited to the implementations contained herein.

Exemplary Product

Figure 2:
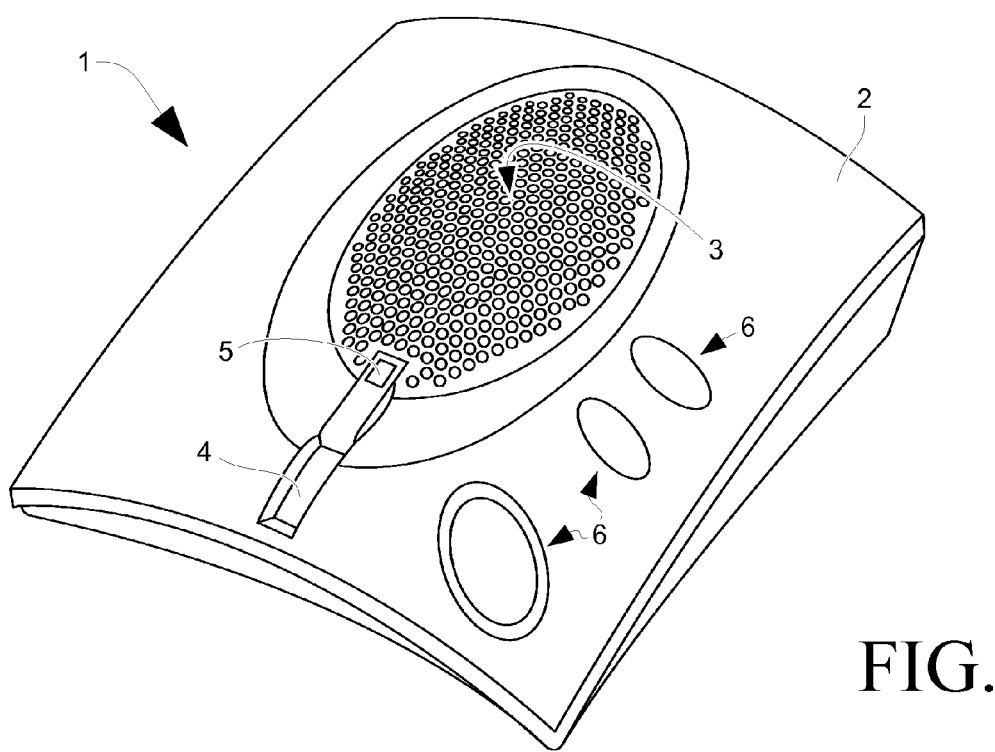
FIG. 2 shows external parts of the exemplary teleconferencing product.

Some of the inventions are described herein in relation to a reference product, marketed and sold as the Chat 50 by ClearOne Communications Inc. of Salt Lake City, Utah. The Chat 50, referenced in the drawings by the number 1, is intended as a portable and versatile speakerphone product, and is relatively small as can be seen in FIG. 1 in comparison to a U.S. quarter. Referring now to FIG. 2, the Chat 50 includes a housing 2, an audio speaker 3, a microphone 4, and operational indicator light 5 and control buttons 6 permitting the control of speaker volume and mute on/off.

One difference between the Chat 50 and other products through which a teleconference might be attempted is that the Chat 50 is designed to be personally adaptable. Most teleconferencing products are designed with a particular channel in mind, for example an ordinary telephone line or its recent substitute, Voice Over Internet Protocol (VOIP). Thus, an ordinary teleconferencing product will include a port to interface with a single channel. The Chat 50 provides an interface to several channel types, by which a user can make a connection to one of several or more channels that happen to be available at the moment.

Figure 3:
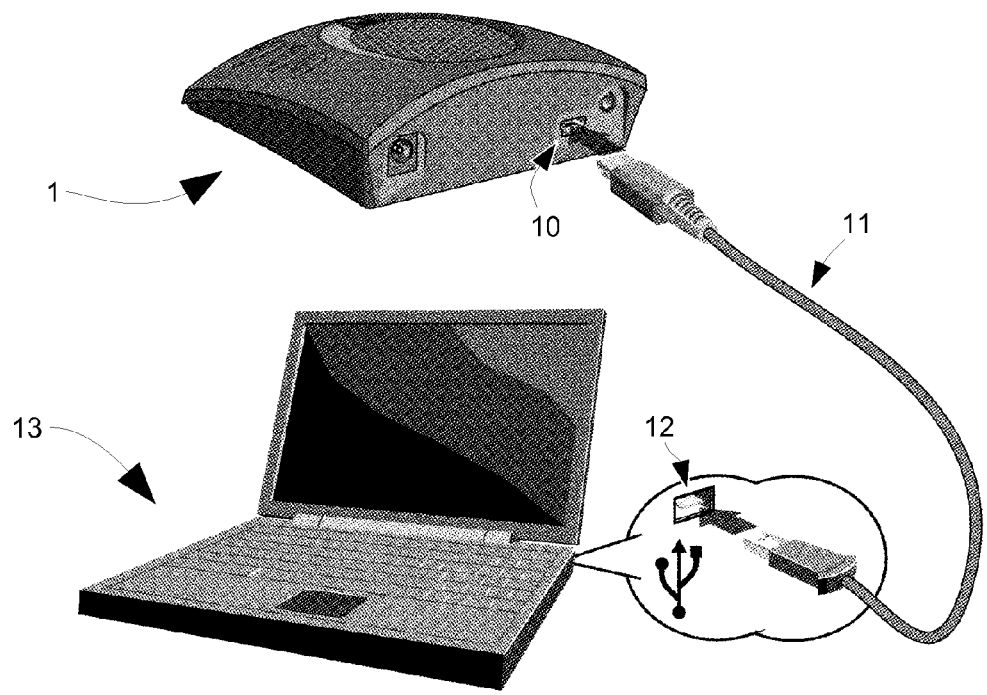
FIG. 3 depicts the connection of the exemplary teleconferencing product to a computer through a USB port.

Referring now to FIG. 3, the Chat 50 is connectable to a computer, for example laptop 13, by way of a Universal Serial Bus (USB) connection. That connection is made by way of cable 11 connecting a first port 10 in the Chat 50 and a port 12 in the computer 13. In this connection configuration, the Chat 50 draws its power through the USB cord 11, and no external power supply is needed unless the port 12 is not a powered USB port (supplying 500 mA at 5V or 2.5 W.) Computer 13 includes software, which may include a driver, that provides for digital communication between the Chat 50 and the audio system of the computer 13, through which audio information input at microphone 4 is made available to computer 13 and audio output information as provided by computer 13 and software running thereon is produced at speaker 3. For example, computer 13 may have an audio subsystem made available to applications generally. Driver software may provide an item in a pull-down menu list of input and output audio selections, and thereby a user can select the Chat 50 microphone as input and/or the Chat 50 speaker as output for applications running on the computer generally.

Alternatively, application software may provide for specific input or output through the Chat 50. For example, a VOIP soft phone may utilize the Chat 50 speaker and microphone, while other applications utilize the general settings for the computer's speakers and microphone, if those are connected.

As will be seen, configuring the audio between general audio channels from the speaker phone channels makes possible certain effects.

Figure 4:
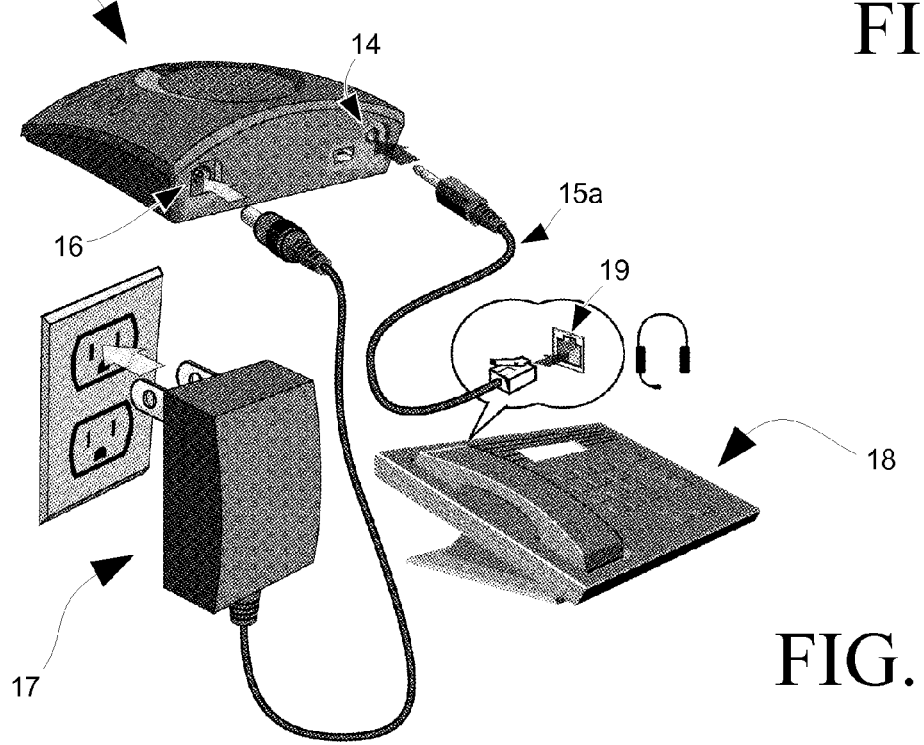
FIG. 4 depicts the connection of the exemplary teleconferencing product to a telephone handset port.

Continuing to FIG. 4, the Chat 50 is connectable to a telephone 18 in place of a handset or headset jack 19 by way of cable 15a insertable to port 14 in the Chat 50. In this configuration, an external power supply 17 is provided for the chat 50 by way of socket 16, although other power sources could also be designed into a portable conferencing device such as batteries. In this configuration the Chat 50 emulates a headset device, receiving and producing analog signals at voltages, currents and impedances suitable for telephone 18.

Figure 5:
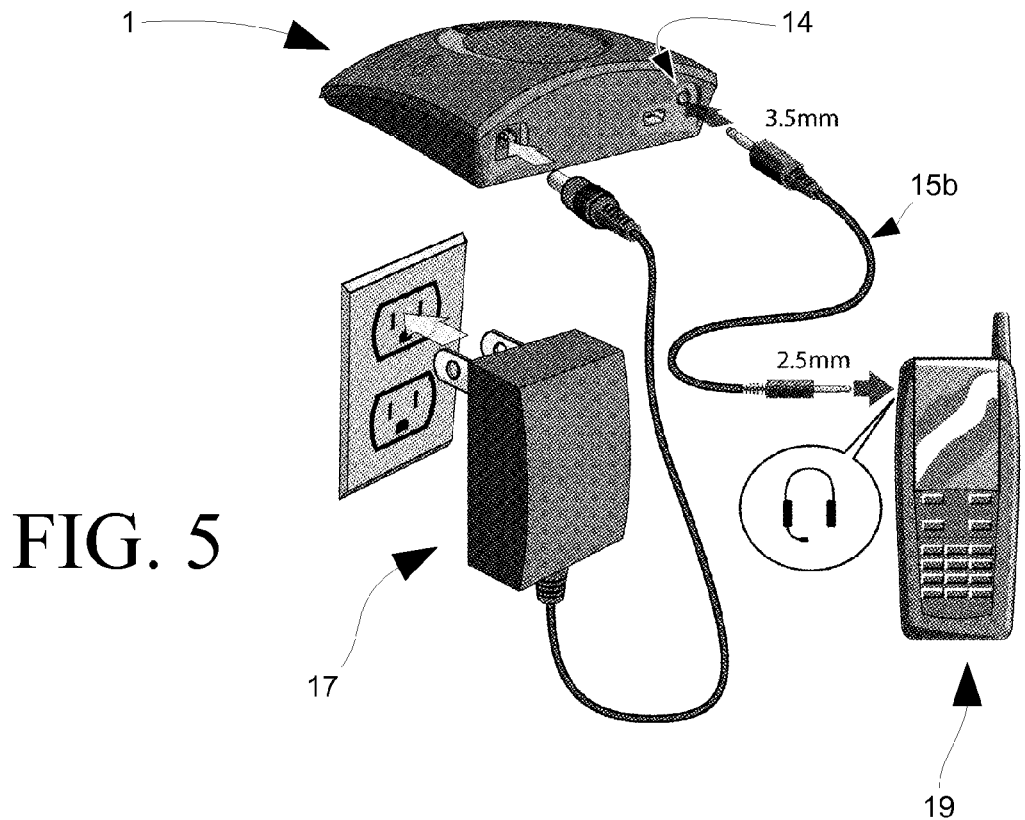
FIG. 5 depicts the connection of the exemplary teleconferencing product to a cellular telephone.

Now referring to FIG. 5, the Chat 50 may also function as a speakerphone utilizing a wireless telephone 19, which might be a cellular or a cordless telephone. The Chat 50 speakerphone product is connectable with not only telephones, but with other media devices, as will become clear below. A different cable 15b is used to make the connection between the Chat 50 and the telephone 19. Cable 15b includes and presents three conductors through its jack connectors: an input, an output and a ground. Cable 15a, intended to emulate a handset, includes four connectors at the telephone side, but three connectors at port 14 by tying a speaker and a microphone line together, for example at the negative (ground) polarity.

Cables 15a or 15b could include one or more resistive elements for impedance matching between the speakerphone device and the telephone. If that is done, a cable will become compatible with a set of media devices, but may not function properly in others. For example, it may be desirable to connect a speakerphone device to a music player 20 as in FIG. 6 or to desktop video conferencing device as in FIG. 7. A cellular phone 19 or an audio player 20 may be configured to be connected to a small speaker, which presents a relatively low impedance as compared to an audio source at "line" levels. Likewise, a media device might accept an input directly from a microphone, such as is done for most telephones, while other media devices might accept an amplified audio source such as the video conferencing device 21.

To achieve improved compatibility with media devices of various kinds, the Chat 50 is designed to vary its impedance and driving characteristics on port 14, whereby a single cable 15b may be used for devices having that particular end connector, which in this example is a stereo 2.5 mm male connector. Those port characteristics are programmable through a microcontroller embedded within the Chat 50. The Chat 50 is designed to be configured through a USB connection made through port 10. That configuration includes the input and output audio (voltage) levels, enabling/disabling the mixing of the USB and analog port audio, enabling/disabling line echo cancellation, and disabling the Chat 50 speaker, some of which features will be further described below. In the Chat 50 the input and output audio lines are current-limited with in-line resistors, therefore modification of the audio levels has the effect of impedance-matching the output driver or input receiver with a selected media device. In comparable devices, impedance matching may be through impedance-adjustable amplifier circuits, current sources or sinks, or any other method. Impedance matching may also be adaptable, through the use of an automatic gain control, if desired. An output bandwidth of approximately 150 to 15,000 Hz and an input bandwidth of about 50 to 8,000 Hz provides a good range for playing music and for picking up speech.

Figure 9:
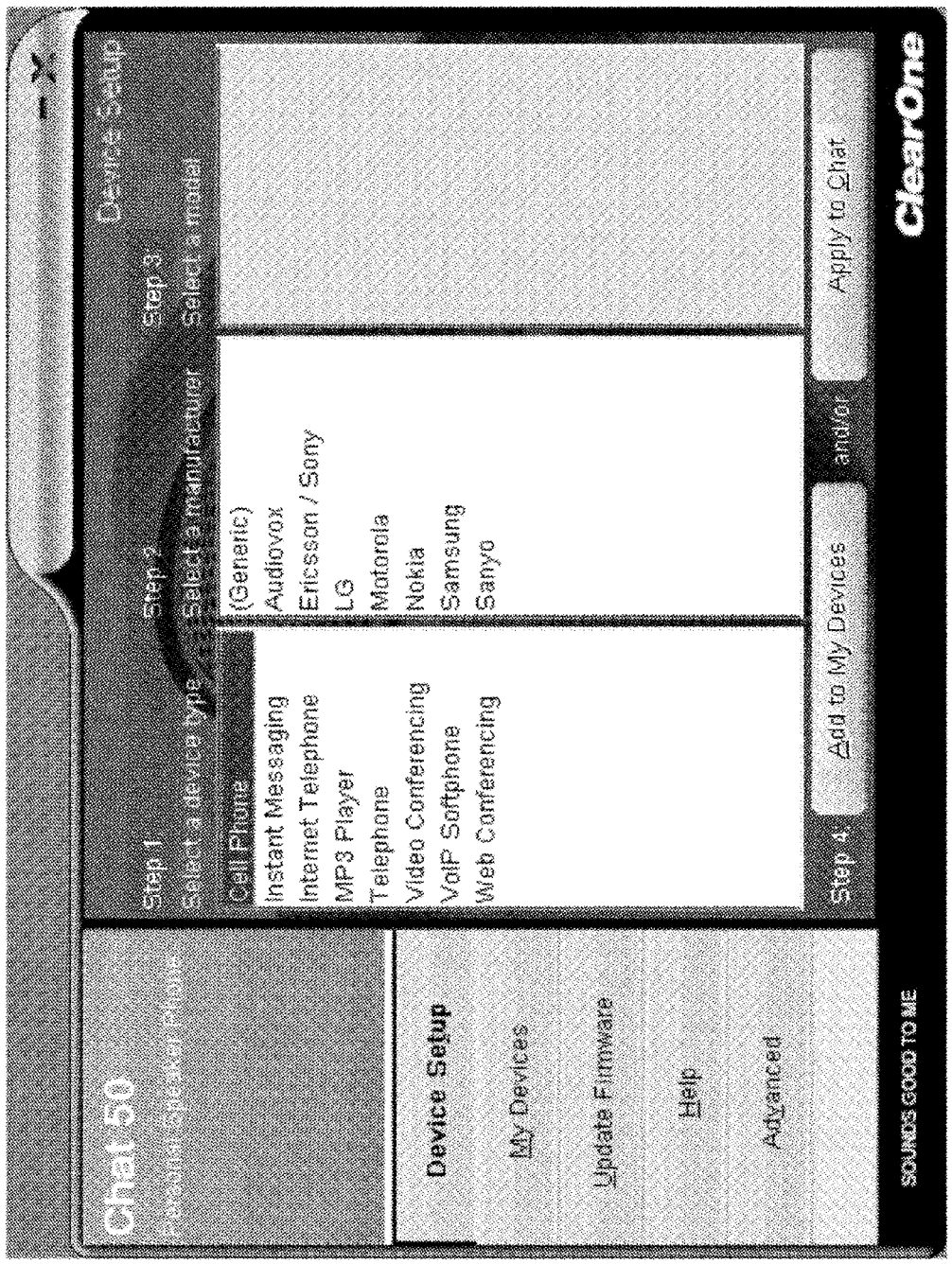
FIG. 9 depicts a screen of the exemplary teleconferencing product software allowing configuration for connection to various audio devices.

The host software of the Chat 50 includes a database of settings suitable for a number of media devices. Selection is made in a screen as shown in FIG. 9. The user is directed to select first a media device type, which in this screen includes the cell phone, instant messaging, internet telephone, mp3 player, regular telephone, video conferencing, VOIP softphone and web conferencing types. Upon selection of a type, a user may select a manufacturer and a model corresponding to the media device intended to be connected to the Chat 50. On selection of a device, the user clicks on the "Apply to Chat" button to download the configuration suitable for the selected device to the speakerphone product. A user is permitted to vary the settings for a media device or add a new device through the "advanced" menu, not shown.

Figure 6:
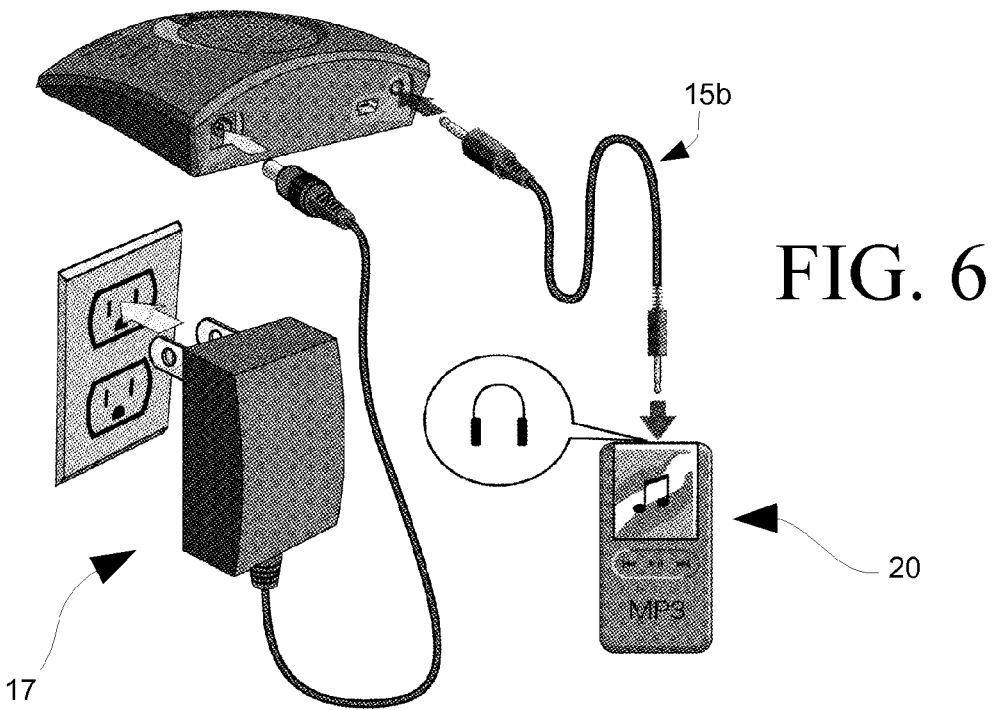
FIG. 6 depicts the connection of the exemplary teleconferencing product to an audio source, in this figure an mp3 player.
Figure 7:
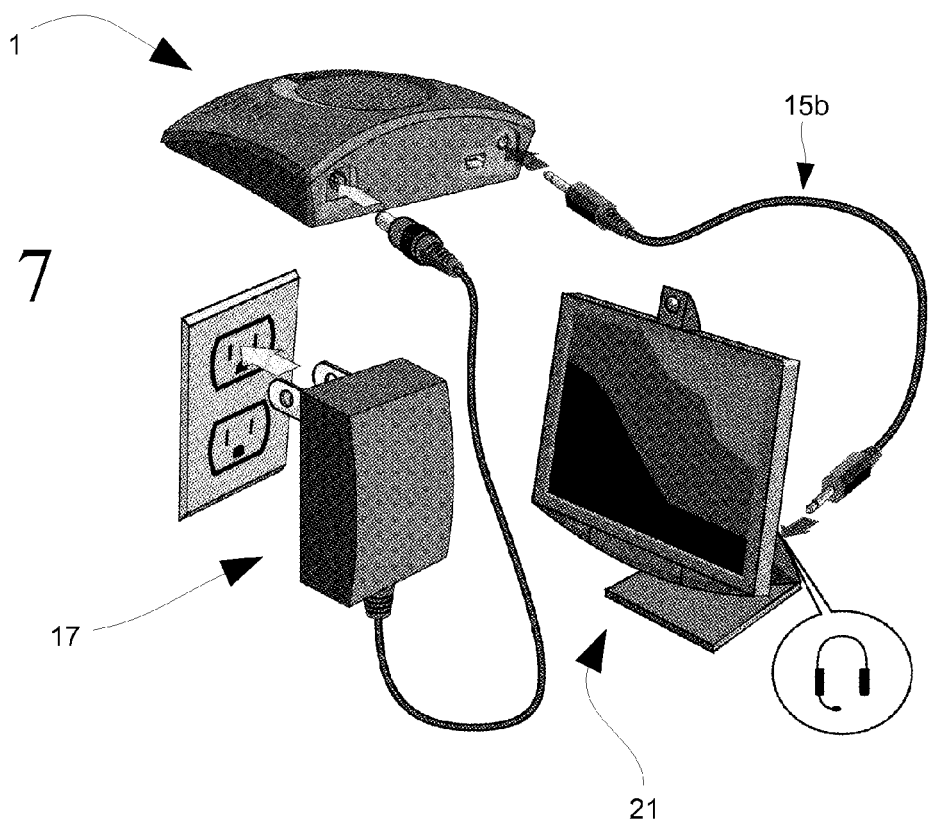
FIG. 7 depicts the connection of the exemplary teleconferencing product to a videoconferencing device including a visual display.

Referring now to FIG. 6, the exemplary Chat 50 product is designed to be a speakerphone, but is also usable as an amplified speaker. This permits a user to listen to musical or educational recordings through attachment to an mp3 player, tape recorder, personal digital assistant, laptop computer or other playback device.

Echo Avoidance Subsystem

Figure 8:
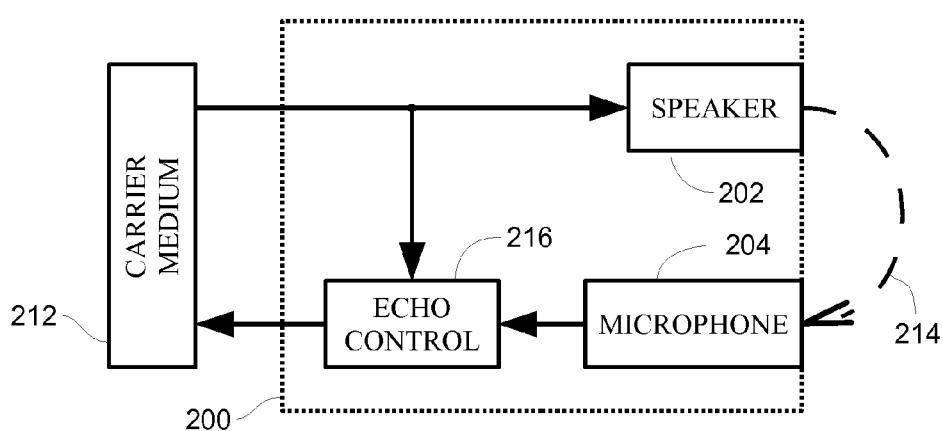
FIG. 8 is a conceptual introduction to line echo cancellation.

As a conferencing device, the Chat 50 operates in one of several echo cancellation modes, generally selected to control echo and feedback at the best levels under the circumstances. FIG. 8 serves as an introduction to the concepts of echo cancellation, depicting the elements of one side of a conferencing system. A conferencing device 200 is connected to a far-side participant through a carrier medium 212, which might be a telephonic channel, for example. Near-side audio is received at microphone 204 and delivered to the far side device at times through medium 212. As far-side audio is received, device 200 produces audio at speaker 202. The sound produced at speaker 202 is picked up by microphone 204 through a feedback path 214. Thus, the far-side participant will hear an acoustic echo of himself with approximately two-times the carrier medium latency plus path latency 214, if production of sound received from path 214 is not controlled or cancelled.

Device 200 may include an echo controller 216 for reducing acoustic echo. Standard methods of control include operation at half-duplex, and operation at full-duplex with echo cancellation. Half-duplex operation simply cuts off the sound received at microphone 204 when the audible volume at speaker 202 exceeds a pre-selected threshold. Many conferencing products implement half-duplex operation, however that operation carries a disadvantage that participants at only one side of the conference can be heard at any time, and neither side can interrupt or acknowledge the other.

When possible, it is therefore preferable to apply echo cancellation to achieve full-duplex operation. In digital audio systems, echo cancellation can be performed by subtracting off, at controller 216, a modified version of the signal produced at speaker 202, leaving only near-side audio. A conceptual method of cancellation merely applies an attenuation and a delay to the outgoing audio, accounting for the delay and attenuation of feedback path 214. However, in the real world path 214 is complex, including dispersed components from reflections off the several surfaces and persons in proximity to the speaker and microphone.

To deal with that complexity, controller 216 ordinarily implements echo cancellation through use of a finite impulse response (FIR) filter, with the received far-side audio signal as input. The FIR filter utilizes a finite number of coefficients of a length sufficient to cover the longest path 214 of significance expected in operation. The reader should recognize that acoustic echoes will be, in general, of longer duration and greater complexity than line echoes. An acoustic echo canceller therefore requires a much larger number of coefficients to provide echo cancellation, which might cover a number of seconds in a device designed for operation in high-echo rooms (rooms with parallel walls and no carpeting.) These coefficients are applied to a copy of the incoming audio, providing the predicted echo component received at the microphone. The determination of these coefficients is by an iterative method, generally understood by those skilled in the art, and will not be further described here for the sake of brevity. In theory, the FIR coefficients could be determined by the application of a step function to the speaker and a recording of the received audio (in reverse) received at the microphone.

In practice, however, the convergence of the FIR coefficients depends mainly on the presence of an incoming audio signal and the general absence of near-side sound apart from that produced by the device's speaker. The concepts related to the convergence operation are illustrated in connection with the diagram shown in FIG. 11. Every speakerphone device includes an incoming audio port 100, an outgoing audio port 101, a speaker or sound-producer 102 and a microphone or pickup 103. This system also implements an FIR echo canceller 106, the output of which is added to the outgoing audio signal at 111. Although it is not a requirement, in the Chat 50 sound is processed in frequency bands by decomposing the incoming signal at analyzer 104 and the microphone signal at analyzer 110. The band signals are brought together at frequency synthesizer 107 into a wideband signal. (A corresponding wideband version of this system merely omits the frequency analysis and synthesis.)

Three meters are used to determine the state of the audio conversation. An incoming audio meter 105 measures the volume of the incoming signal. A pre-EC meter 109 measures the volume at the microphone, and a post-EC meter 107 measures the outgoing signal after echo cancellation. These meters are not intended to present instantaneous readings, but rather indicate the amplitude of their respective signals over a period of time, for example by the use of a peak detector with a decay over a period (which may be on the order of 20 to 30 samples at 16 kHz up to around one second for human conversation.) An indication of good FIR coefficient adaptation is a high volume detected before echo cancellation and a low volume afterward, which can generally only occur if there is significant coupled far-side audio in the absence of near-side audio.

To avoid non-convergence or divergence of the FIR coefficients, the convergence operation should be enabled while there is an incoming far-side signal, with near-side audio at a volume about less than the desired degree of echo cancellation. Operation in the presence of a near-side signal may introduce random errors into the coefficients, while operation with a weak far-side signal can result in a non-converging filter. The first general condition of operation, therefore, is that convergence should only proceed while there is a significant signal at incoming meter 105.

The second general condition of operation is that convergence should not proceed while there is a substantial near-side signal. As will be discussed below in connection with one method, if the FIR coefficients are well-adapted, the system can detect this condition again by periods of low amplitude at meter 108 and higher amplitude at meter 109. If badly adapted, such a condition will generally not occur. Rather, meter 108 will tend to track meter 109 until the echo canceller begins to be effective. Or, in the case where the coefficients have badly diverged, meter 108 can have a higher amplitude than meter 109. In this case the echo canceller is producing echo. Regardless of the state of the echo canceller, the system can detect the presence of near-side audio in the absence of far-side audio, because meter 109 will be high and meter 105 will be low. The remaining two states are the most difficult to discriminate between.

Those two more difficult states are "far-end singletalk", the condition of having far-end audio but no near-end audio, and "doubletalk", which is audio on both sides. Since it is desirable to perform convergence only in the presence of singletalk, a reliable doubletalk detector contributes greatly to rapid convergence and reliable adaptation of an FIR echo canceller. However, a highly reliable doubletalk detector has been elusive in practice, particularly where changes in the echo path environment can spontaneously occur.

Tracking Conversations

Figure 13:
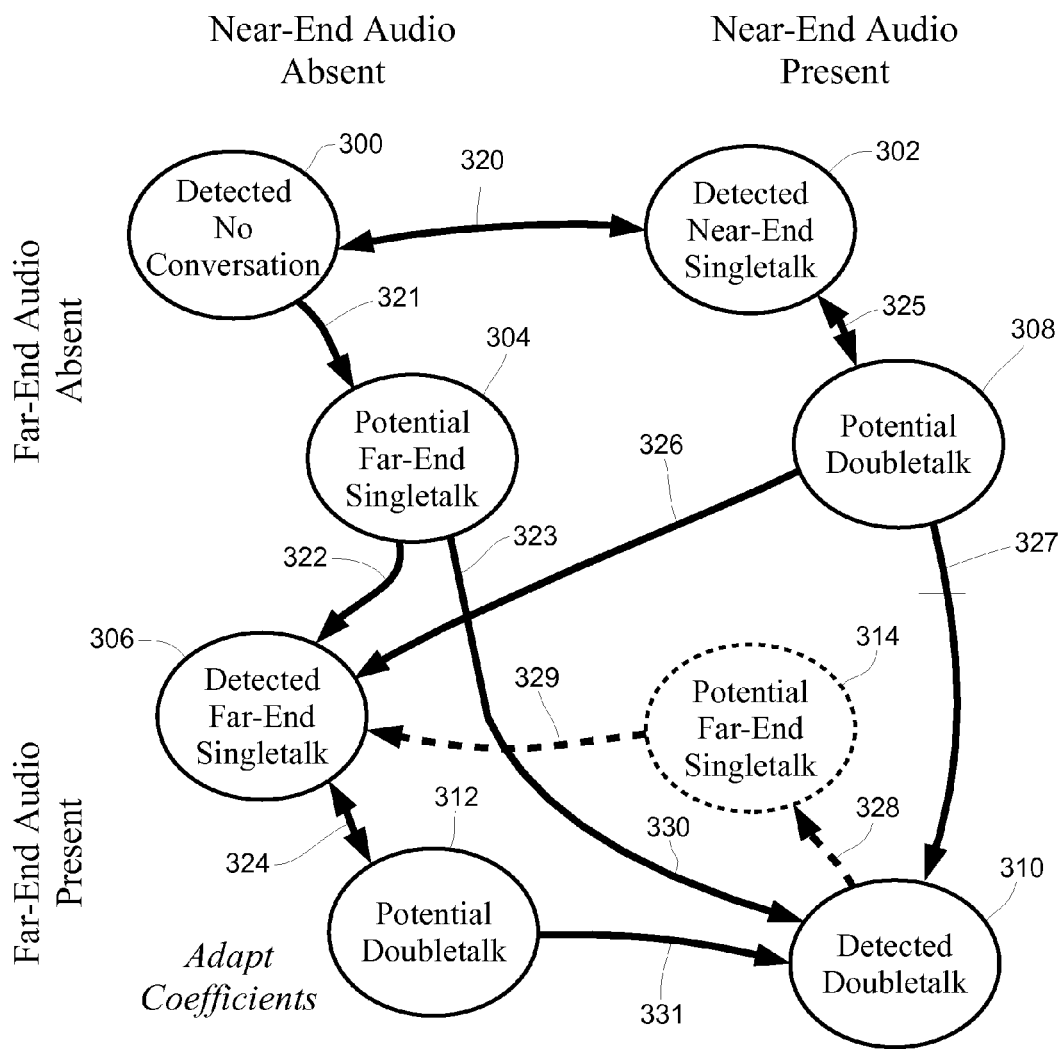
FIG. 13 conceptually depicts a conversation-tracking state machine.

The Chat 50 implements a conversational tracker, implementing a conceptually similar state machine as that shown in FIG. 13. There, the conversation is divided between four quadrants corresponding to the presence or absence of near and far-end audio. As this state diagram is discussed, the reader will note that the state machine may lag behind the actual conversational state. In practice, this latency does not meaningfully affect echo cancellation if the coefficient adaptation is sufficiently slow, i.e. adaptation is not performed too long after the actual conversation departs from far-end singletalk. In the Chat 50, the echo canceller is adapted after about 10 seconds of far-end singletalk under nominal conditions. As this state machine is discussed, complications and problems associated with the detection of doubletalk will become more apparent.

The purpose of tracking a conversation in operation is mainly to apply coefficient adaptation at correct times and to detect potentially erroneous operation, i.e. improper echo cancellation. Again, coefficient adaptation is to occur in the presence of far-end audio and in the absence of near-end audio, so adaptation should occur in the lower-left quadrant in FIG. 13. As will be described further below, it is possible for this system's predictive models to get out of sync with the actual environmental echo paths, introducing a need to detect this condition and make a recovery.

Figure 11:
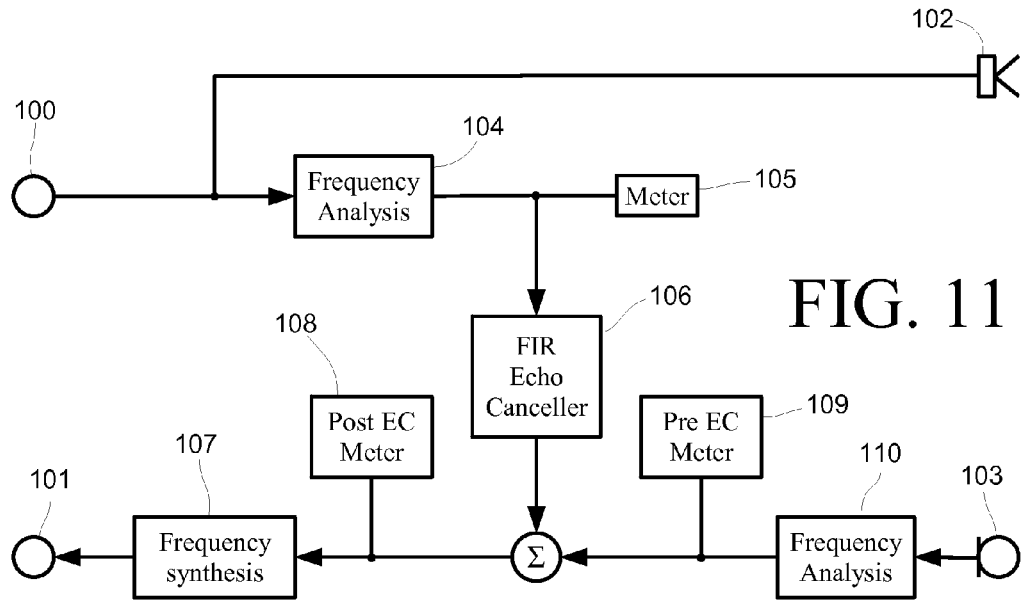
FIG. 11 conceptually shows a metered echo cancellation and doubletalk detection system.

Now entering into the specifics of the machine shown in FIG. 13 in reference to the metered cancellation system shown in FIG. 11, a first state 300 is entered any time the audio levels on both the near and far sides drop below specified thresholds. No conversation is by far the easiest condition to detect, which in the system of FIG. 11 may be detected by a low level at incoming meter 105 and at pre-EC meter 109. Again, those meters do not measure instantaneous levels, but rather measure amplitudes over a number of samples. A return to a state of detected no conversation 300 may be conditioned on a period of silence, for example 0.5 second, to avoid a state change on momentary spaces or pauses between the words of participants. To simplify the diagram of FIG. 13, the return paths to state 300 are not shown, but it should be understood that a return to that state will occur when no conversation is taking place.

At some point, audio above threshold levels will be detected at the near or far sides. The conversational state of near-end audio present but no far-end audio is also relatively easily detected. A high amplitude at the pre-EC meter 109 combined with a low incoming amplitude at meter 105 conclusively determines this state. In the state machine, the detected near-end singletalk state 302 is then registered. If the near side ceases to speak, state may return to no-conversation 300.

Detection of an audio level at incoming meter 105 causes the state machine to detect potential far-end singletalk 304. The uncertainty lies in the fact that pre-EC meter 109 will be high, regardless of whether near-end audio is present. Methods may be used to discriminate between these two, as will be discussed below. After a time, a determination will be made whether a far-end singletalk or a doubletalk condition is present. If doubletalk is deemed to be present state 310 will be entered. Otherwise, state 306 will be entered bringing the assessment of the conversation into the lower-left quadrant, and coefficient adaptation will proceed.

Likewise, if incoming audio is detected by meter 105 while in a state of near-end singletalk 302, a transitory state of potential doubletalk 308 may be entered. There, a determination will be made to doubletalk 310 or far-end singletalk 306, or if far-end audio ceases back to near-end singletalk 302.

In a state 306 of conversational far-end singletalk only, a detection may indicate doubletalk. Another transitory state 312 may be entered, more or less to filter short doubletalk events that are not of sufficient length to significantly affect the cancellation coefficients. If doubletalk continues, state 310 is entered. The entry of a state 314 is a design choice, permitting return to a far-end singletalk condition. From any of the states shown, a return to one of states 300 or 302 may occur at any time if incoming audio drops out.

Now the state diagram of FIG. 13 is merely exemplary of possible conversational tracking devices. However that diagram, and its method, are useful to come to an understanding of further methods of detecting doubletalk. As suggested above, an FIR echo canceller may have its coefficients updated through the use of half-duplex operation. There, convergence during doubletalk is avoided by zeroing out the microphone to line out signal (having the same effect as turning off the microphone) while incoming audio is present. The microphone input is applied to coefficient adaptation when incoming audio is present at volumes sufficient for coefficient convergence. Although this method relies on the near-end participants remaining quiet while the far-end participants are speaking, this method works well because the near-end participants will usually realize that they are not being heard. After a period of time or as the coefficients are noted to be sufficiently stable, full-duplex operation may be commenced enabling echo cancellation and the possibility of doubletalk.

Static Adaptation

In a constant-state environment the coefficients, once established, would continue to work through the remainder of the connection. Therefore, the initial main effort is normally to establish a good set of coefficients as early as possible. For such a static environment, for example a single person sitting in one position with his arms to his sides away from the speaker and microphone, the echo reflection paths in the environment are relatively constant and the coefficients would not need to be updated. However, people do shift and move about in the environment between the speaker and microphone, which introduces echo-cancellation errors into the system.

Many conferencing systems are configured to minimize this environmental echo path time variance. Room conferencing systems are often configured with speakers in the ceilings or walls, with microphones built into a table. Many automotive hands-free systems are configured similarly, utilizing the car's ordinary speakers and a microphone built into or attached to the dashboard. By separating speakers from microphones by such a distance, these environments usually have a direct air path from speaker to microphone and a large number of reflective paths, for example off of walls. The movement of a person in that environment is likely only to affect a small minority of the echo paths present. Thus, in that configuration, the probability of a computationally substantial coefficient difference with the true echo paths in an environment is quite small. There, the echo canceller will typically work at not worse than a somewhat degraded performance, even if some variation in the environmental reflective paths occurs.

One method of doubletalk detection relies on that quality. In that method, a value representing the loss in transmission between the speaker(s) and the microphone is measured and or calculated. This "echo return loss" or ERL in an ordinary conferencing system might be 6 to 12 dB. Referring back to FIG. 11, this ERL is calculated over time from levels read between meter 105 and pre-EC meter 109, for example by averaging to filter out instantaneous errors.

A second value is calculated representing the effective echo cancellation, or the signal loss between pre-EC meter 109 and post-EC meter 108 under conditions of far-end singletalk, called the "echo return loss enhancement" or ERLE. This, again, can be calculated by the system by watching those meters at times when far-end singletalk is reliably detected. For a well-adapted filter, the loss may be 20 to 30 dB, depending on a number of factors including the amount of noise in the system and environment.

Finally, a third value is computed through the course of the conversation, which is the "predicted post-EC level" (PPEL), which is the incoming reference signal minus the ERL and the ERLE. A comparison of this computed value against the post-echo cancelled level (at post-EC meter 108) indicates whether doubletalk is present. For example, in a well-adapted system the ERL might be 6 dB and the ERLE might be 30 dB, with a predicted far-end singletalk loss (PPEL) of 36 dB. A threshold may be chosen, for example half of that value 18 dB, by which doubletalk is discriminated. Under far-end singletalk conditions with an incoming signal at a level of 0 dB, the post-EC level at meter 108 will be about the predicted value of −36 dB. If near-end audio is present at 0 dB, it will not be cancelled and the post-EC level will be read near 0 dB. Remembering from the discussion of FIG. 13 that the presence or absence of far-end audio is readily discernable, this method can detect doubletalk in some environments and avoid coefficient adaptation when it is present.

The method of doubletalk detection just described is a presumptive system, as it presumes that the filter coefficients are never so incoherent that corrective adaptation cannot occur. Thus in the exemplary method just described, so long as changes to the environmental echo paths do not degrade the echo cancellation by more than about 18 dB, the system will continue to detect far-end singletalk and make appropriate corrective coefficient adaptation. Therefore, in a relatively stable echo-path environment a presumptive method may suffice.

In start up the exemplary architecture operates initially in half-duplex mode until a sufficient quantity of far-end speech has been processed or until the FIR coefficients settle. In the Chat 50, for example, coefficients settle after about 30 seconds of far-end speech. Once the coefficients have settled, a speakerphone may enter full-duplex mode with good echo cancellation.

Echo Acoustics in Portable Devices

The exemplary stable environments mentioned above, with a substantial separation and a potential direct path between a speaker and a microphone, are generally speaking, not applicable to a portable device. Rather, in a portable conferencing device it is desirable to incorporate the speaker and microphone in the same enclosure, small enough to place in a briefcase or even in a purse or pocket. This has two effects, which can be understood by reviewing FIG. 1. First, the separation of the microphone and speaker will be less than about one foot and may even be only a few inches or less. This increases the coupling between the speaker and microphone leading to smaller ERL values, and less room for discrimination of doubletalk. Such coupling may be either through the air, or may be through the enclosure housing the speaker and microphone at perhaps lower frequencies.

Perhaps even more importantly, the likelihood of a participant placing or removing an object to or from the immediate vicinity of the speaker and microphone is much higher. For example, it is foreseeable that a traveler might take a portable conferencing device to a hotel room, and place the device on a small table or surface that so commonly is found in those places. Papers, other objects or a person's arms may be placed to or removed from the close proximity of the device (or even on the device), potentially radically changing the echo path between the speaker and microphone.

Second, the audio from the speaker will likely be directed away from the microphone as much as possible, in avoidance of input overloading and speaker to microphone coupling. Unlike the static environments described above, the reflections of sound from the speaker may be nearly as loud or louder than the sound transmitted directly to the microphone. Therefore, echo path changes may be more exaggerated.

Portable conferencing devices such as the Chat 50 are much more susceptible, therefore, to coefficient incoherence resulting from significant echo path changes. Again, in a presumptive system should the echo-cancellation coefficients lose their significance, the system may not be able to discriminate between singletalk and doubletalk. Thus, in the presence of far-side audio the echo-cancelled signal output may remain at a high level, because of ineffective cancellation. This is a failure particular to presumptive doubletalk discrimination methods. Because the system produces a high after-echo cancellation signal, a presumptive method may always indicate doubletalk and never far-side singletalk. In such a state, herein referred to as false doubletalk, the coefficients are not adapted further and echo cancellation proceeds in a potentially permanent state of degradation.

The reader may recognize that, generally speaking, high frequency tones are directional and low frequency tones less so. Where an echo-path changing event occurs, it is more likely that high frequency paths will be more affected than low frequency ones. Therefore, in the Chat 50 a primary doubletalk detector is included that uses as input low frequency audio information, which provides greater reliability of doubletalk detection. Additionally, the Chat 50 design couples the speaker and microphone at about 200 to 500 Hz. Where a doubletalk detector is limited to these enclosure-coupling frequencies, this increase in speaker to microphone coupling provides immunity against doubletalk detection failures due to incoherent coefficients in the echo cancellation system, because the far-side effect is boosted in those frequencies over the echos that might occur through the air. (That is not to say that a product must provide coupling through a housing between a microphone and a speaker, but rather it is considered a good practice to minimize that type of coupling as much as possible.)

An echo path change is more likely to affect the high-frequency echo profile. A secondary doubletalk detector may be used, as in the Chat 50, to act as a confirmation of good doubletalk detection or as a false doubletalk detector for a primary doubletalk detector. Thus, if a high-frequency doubletalk detector indicates doubletalk detection more often or at different times than a low-frequency one, the system may recognize that an echo path change event has occurred and take steps to adapt the echo canceller to the new environment.

False Doubletalk Recovery

It may be seen from the above that certain portable conferencing systems can benefit from a non-presumptive method of false doubletalk recovery. These methods may generally take one of two forms. The first is a detection of erroneous doubletalk discrimination which may be followed by impaired non-echo cancelled operation until new coefficients become adapted. For example, the system might notice the lack of detected proportional singletalk as compared to detected doubletalk, or notice that a transition from far-side singletalk to doubletalk has not recently occurred. Upon crossing below a low far-side singletalk to doubletalk ratio, or other trigger, the system can switch into half-duplex mode, attenuate the sound produced at the speaker, apply enhanced non-linear suppression or other more positive doubletalk detection or echo preventive measures.

The second non-presumptive method implements an overriding doubletalk detector with potentially continued echo cancellation. Again, positive doubletalk preventative measures can be taken to enhance recovery, if desired. The selection between these types of non-presumptive recovery methods is largely a design choice, depending on the particular behavior desired for a portable device in its intended environments.

Exemplary Architecture

Figure 12:
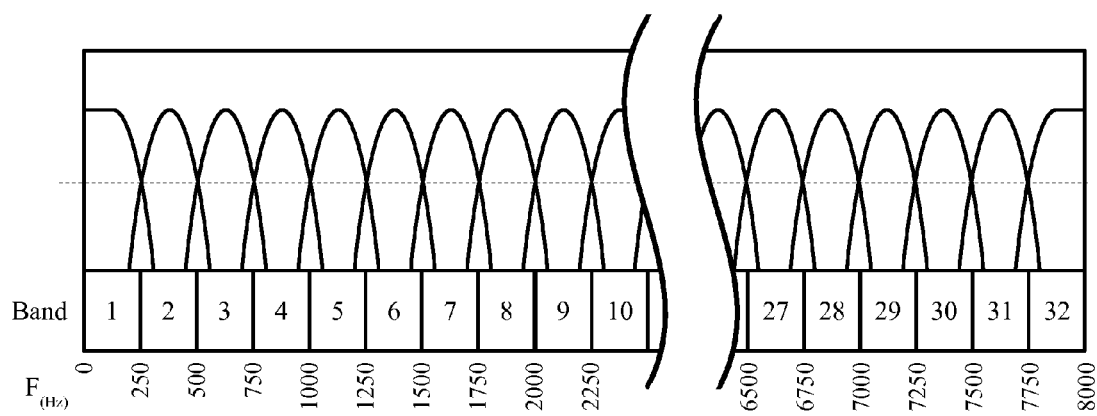
FIG. 12 shows the frequency sub-band structure used by the exemplary teleconferencing product.

The Chat 50 implements a redundant doubletalk detector and a non-presumptive recovery method, which will be described below after a architectural discussion of the Chat 50 signal processing architecture. Now in further detail, the Chat 50 implements a frequency band decomposer producing frequency bands as shown in FIG. 12. The Chat 50 samples at 16 kHz, and has a main bandwidth of 8 kHz. Wideband audio signals are processed by the decomposer to produce 32 time-domain signals in bands each 250 Hz wide. These bands are sampled at 1 kHz (2× oversampled) from the 16 kHz main signal.

Referring back to FIG. 11, the system generally implements for each band an incoming meter 105, a pre-EC meter 109, a post-EC meter 108 and an echo canceller 106. FIG. 11 references the several meters and an echo canceller in relation to two frequency analyzers 104 and 110 and a frequency synthesizer 107. The reader should now recognize that FIG. 11 represents an echo canceller of the Chat 50 in one of its 32 bands.

Figure 10:
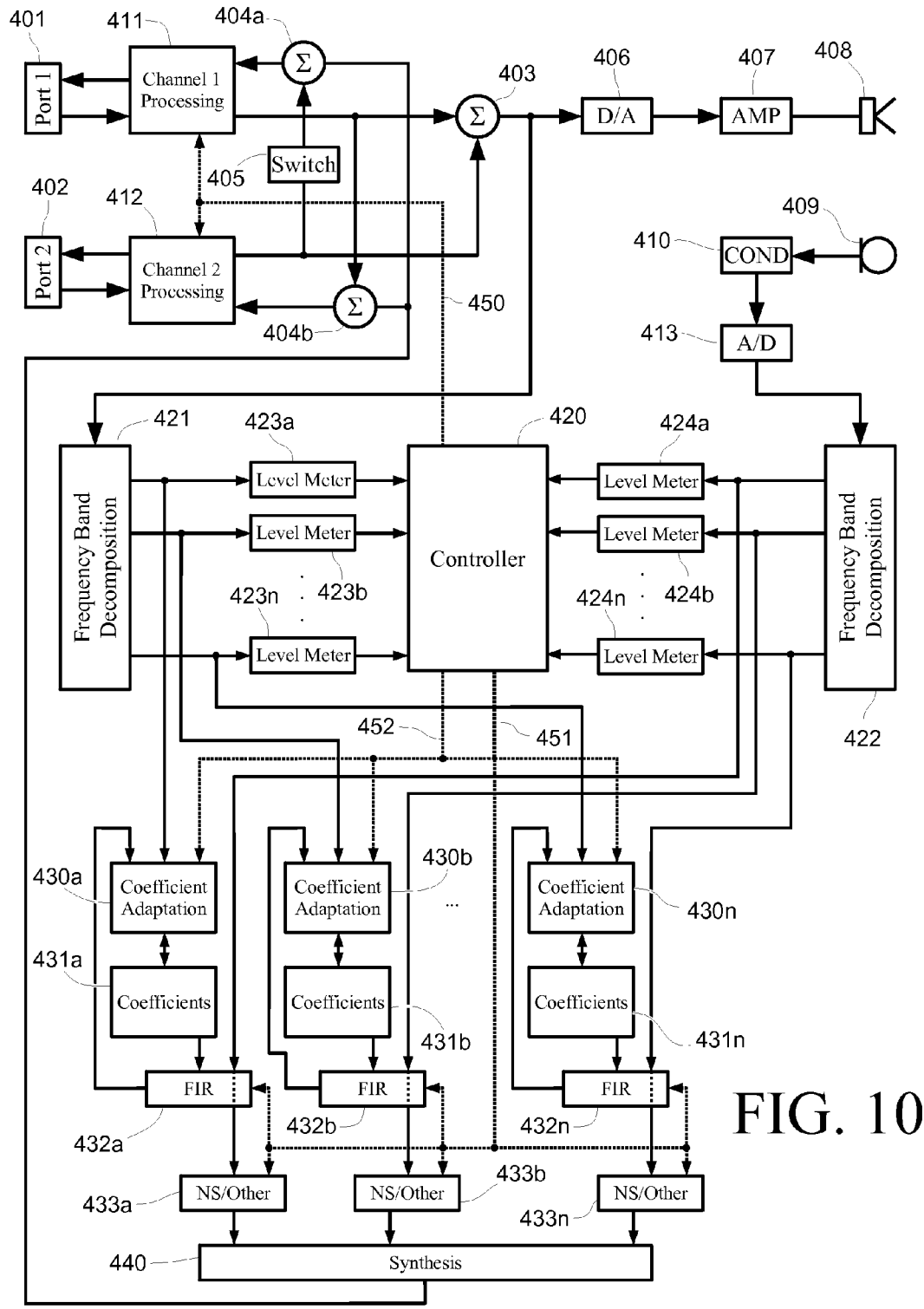
FIG. 10 conceptually shows the architecture of the exemplary teleconferencing product.

Continuing in further detail, FIG. 10 shows the signal processing architecture conceptually as implemented in the Chat 50. Again the Chat 50 includes two ports 401 and 402, which are both operable in full duplex. The signals of ports 401 and 402 are processed by processing modules 411 and 412, which may convert and/or condition the incoming signals to and from a digital representation at levels appropriate for signal processing. Incoming audio from both ports is summed together 403 and passed to a speaker 408 by way of a digital-to-analog converter 406 and an amplifier 407. The output of summer 403 is also passed to the echo cancellation section, will be described hereinafter.

The architecture of FIG. 10 implements two frequency band decomposers 421 and 422. One of these operates on the product of summer 403. The other receives an audio signal from a microphone 409 by way of a signal conditioner 410 and an analog-to-digital converter 413. Both of decomposers divide out the incoming signal by frequency into n bands, which are supplied throughout the architecture as shown.

A controller 420 controls the operation of certain functions and operates a state machine as shown in FIG. 12. Controller 420 receives as input values from level meters 423*a-n* indicating band volumes present in the audio coming through ports 401 and 402, and from level meters 424*a-n* indicating band volumes received at microphone 409. Meters 423*a-n* and 424*a-n* are analogous to meters 105 and 110 in FIG. 11, respectively.

The remaining processing elements are divided between the n (here 32) bands, including one of a coefficient adaptation module 430*a-n* operating on coefficients 431*a-n* particular to a band, a finite impulse filter 432*a-n* producing echo cancellation, and noise suppression and other processing 433*a-n*, all of which are recombined into a wideband signal by a frequency synthesis module 440. The wideband output of synthesis module 440 is supplied to processors 411 and 412, which potentially results in a signal transmitted through ports 401 and 402.

For each band, an echo canceller is formed by one of adapters 430*a-n* in conjunction with a set of one set of coefficients 431*a-n* and a filter 432*a-n*. It is to be understood that this application of echo cancellation by band is but exemplary, in that a wideband canceller or other echo cancelling arrangement could be used with the doubletalk discrimination methods disclosed herein. The echo cancelling filters 432*a-n*, noise suppression and other processing 433*a-n* is controlled in this system by a common control signal 451. Thus, controller 420 can command that half-duplex operation and/or noise suppression operation is enabled, or full-duplex operation with echo cancellation across all bands. Each of adapters 430*a-n* is controlled by signal 452, thus controlling the adaptation of coefficients 431*a-n*.

Each coefficient adapter 430*a-n* takes as input the incoming audio of its band and the potentially echo-cancelled output of its corresponding filter. At times as commanded by controller 420, each of coefficient adapters 430*a-n* adapts coefficients 431*a-n*. Those coefficients are made available to FIR echo-cancellation filters 432*a-n*, which receive as input control signal 451. The output of echo-cancellation filters 432*a-n* is recirculated to adapters 430*a-n* regardless of whether echo-cancellation is being applied to the outgoing audio signal, thus enabling coefficient adaptation at any time controller 420 has an indication of far-end singletalk.

Doubletalk Detection in a Portable Device

One problem associated with metered doubletalk detection is noise. This is particularly important for the near side of the conversation, because far-side singletalk detection relies on the absence of near-side sound. For example, there may be noise in the near-side environment from computer fans, central air conditioning, traffic noise, etc. If the local noise is at such a level that a pre-EC meter does not drop below a threshold level, far-side singletalk will not be detected. Similarly, if the echo cancellation coefficients become weakly incoherent, a presumptive doubletalk detector may cease to function if noise increases.

Analysis and experimentation using the Chat 50 design has yielded improvements to the presumptive method of doubletalk detection described above. First, because the Chat 50 processes signals in bands, an opportunity is made to implement doubletalk detection using indications from one or more bands. The Chat 50 implements a doubletalk detector on each band and processes the output signals as described below.

An analysis was undertaken to understand which frequency bands are best indicators of the presence of near-end speech in the types of indoor environments a portable conferencing system is likely to be used. In the portable environment, experimentation showed that frequencies below about 750 Hz are better indicators than frequencies above. In other environments, it may be appropriate to use other frequencies. Therefore, in the Chat 50 bands two and three are utilized as the primary indicators of doubletalk. These doubletalk indicators are logically ORed together so that if either (any) indicator suggests doubletalk the controller 420 will interrupt adaptation.

Confirmatory Doubletalk Detection and Recovery

Detection of incoherent coefficients may be through implementation of a secondary confirmatory doubletalk detector. Therefore, if a secondary detector indicates singletalk without echo cancellation, i.e. high incoming signal at meter 104 concurrent with a non-low post-EC reading at meter 108 in FIG. 11, the coefficients are likely to be incoherent with the present echo paths in the room. In that case, the system may revert to an alternate mode of rapid coefficient adaptation or protective performance until coherence is again established.

One coefficient incoherence detector relies on an analysis of meter levels in different bands. A doubletalk detector is implemented for two or more bands and the results are compared against each other as a check on doubletalk detection reliability and/or coherence. In prior conferencing systems this was not done, first because it requires decomposition of a microphone input into bands (which may be regarded as unnecessary) and second because coefficient incoherence was likely similar between frequencies. Thus, if doubletalk detection in one band became incoherent it was considered likely to be incoherent in the others. As described above, in a nonportable conferencing system the separation between the speakers and the microphone and echo path change would have a wide band effect across the frequency spectrum.

For a portable conferencing device such as the Chat 50, echo path changes resulting from the movement of objects in close proximity to the device have potentially a much-less than wideband effect. This is because the main echo reflection from the speaker to the reflecting object to the microphone will be short. That path may be much shorter than the wavelength of a low frequency traveling through the air. Because of this, low frequency reflections have less phase change than high-frequency ones. Furthermore, low frequencies tend to reflect less off of small or soft objects (in proximity to the device) and those echoes will change less in amplitude. Thus, an object moved close to the portable device may cause high frequency coefficient incoherence, but leave the echo cancellation at low frequencies acceptably good for doubletalk detection.

Even if doubletalk detection at low frequencies remains functional, some change in the echo paths still occurs. This can result in degraded echo cancellation performance; the far-end participants may hear some residual echo. In the Chat 50 doubletalk detection is likely to continue to work because the primary detector utilizes low frequency bands, as described above. However adaptation is, under ordinary conditions, gradual, and residual echo may be heard for an unacceptably long time.

The difference in indications between a primary and a secondary doubletalk detector (which may be used as an echo path change detector) may be used to detect degradation of coefficient coherence, and signal a conferencing system to apply more rapid coefficient adaptation, nonlinear processing, or to enter a non-echo cancellation mode such as half-duplex mode. In the Chat 50, a sufficiently long period of low frequency far-side singletalk contemporaneous with high frequency doubletalk triggers a detection of an echo path change, upon which the coefficients are reset to an initial or power-on state. In the chat 50 in particular, comparison is made between low frequency bands one and two and high-frequency bands 8 to 23. The reader will recognize that other frequency bands might be used depending on the particular characteristics of a device or product and the expected environment in which it may operate, and the criteria (a threshold ratio of time in doubletalk between a primary and secondary doubletalk detector, for example) used to detect false doubletalk or an echo path change is likewise selectable by a designer of such products for the environments and operator behaviors expected.

Selective Mixing

The Chat 50 is configured in several modes of operation. The first of these modes operates exclusively through the USB port. In this way a person can conduct a VOIP telephone call through the Chat 50 speaker and microphone, effectively rendering the computer and portable conferencing device into a conferencing telephone. In the second of these modes the Chat 50 is connectable through its second non-USB port to an analog device, such as a video codec or a headset port on the telephone. This mode also effectively renders the portable conferencing device and the connected device into a speakerphone.

A portable conferencing device, such as the Chat 50, can utilize a third mode in which both ports are active. This mode is referred to as mix mode. Thus, when the device is being used for telephone conversations, two far-end parties may participate and all parties can hear each other. Now referring back to FIG. 10, in that architecture the summing of incoming audio by summer 403 from both ports 401 and 402 produces mixed audio at Speaker 408. Incoming audio from the far-end participants is passed to each other through mixers 404a and 404b. As audio from both far-end parties is now being produced at the speaker, it is desirable to echo cancel the audio of both parties. To achieve that, the incoming audio is summed (or mixes) at mixer 403 and provided to the echo cancellation processing at decomposer 421. This has the effect of echo cancelling the same signal produced at speaker 408.

The reader should recognize at this point the far-end participants can hear each other through the passing of their audio between ports one and two, and further those participants can not hear each other through the echo between the speaker 408 and microphone 409 if echo cancellation is operable.

The Chat 50 includes another mode similar to mix mode, however in this mode a far-end party receives only partial audio. This is accomplished by way of switch 405, which prevents the incoming audio signal from port two being passed to the outgoing channel of port one. In a telephone conversation, control of transmission of local audio is usually controlled by the local participants. For example, in a three-way conversation if one party is not to be heard, that party would press "mute" on their local device. It has not been desired to block the audio between the far-end participants because that interrupts the conference. However with switch 405, it is possible for a local participant who desires to hear comments from a private party to prevent the reception of that audio by a third participant. For example, it may be that a first party wishes to have a telephone conversation with the second party concerning the negotiation for the sale of an item, under conditions where the first party can be coached by a third party. Or in another example, the first party might be providing audio to multiple participants, while being cued to start and stop a broadcast by studio personnel. Conventionally, this would be done through the wearing of an earpiece by the first party, whereby the audible sounds from the third-party would not be picked up at a local microphone. Through use of this mixed mode with partial audio transmission, or simply partial mixed mode, the first participant need not wear an earpiece and gains the advantages that go with a speakerphone.

Or, in another example, a person may wish to have a telephone conversation with another person, while listening to music or a sports broadcast. For the Chat 50, port one would be connected to VoIP software while port two is connected to a music producing device such as an MP3 player or a radio. While the conversation is going on, music is produced at speaker 408. However, the far end participant connected to port one cannot hear the music because it is echo cancelled, provided that switch 405 is logically open.

In a different example, the Chat 50 is configured to produce generic computer sounds through the USB interface. Port two is connected to a telephone handset port of a telephone, thereby producing a speakerphone. If port two is used in partial mixed mode, sounds produced by the computer, such as error beeps and other audible indications, are not heard at the far end of a conversation.

Switch 405 could be a physical switch, but is preferably a flag or a configuration setting stored in the portable device. Switch 405 may be implemented in software/firmware by either not summing the opposite port incoming audio with the outgoing audio or merely by substituting a null signal. Switch 405 may be implemented in many ways.

In an alternate configuration, not only is there a switch from port two to port one, but also a switch from port one to port two. This permits an arbitrary selection for which port is to receive partial audio. A separate control for each switch maybe implemented, however it may feasibly simplify the operation of the device for a user to operate both switches from a common control, or to implement the two switches as a single switch.

Now although functions and methods implemented in the chat 50 have been described above, one of ordinary skill in the art will recognize that these functions and methods are adaptable to other audio products, including but not limited to conferencing devices, hands-free devices, playback devices, and recording devices. Likewise, although the described functions have been described through the use of block diagrams and in hardware, one of ordinary skill in the art will recognize that most of the functions described herein may be implemented in software as well. Additionally, the exact configurations described herein need not be adhered to, but rather the diagrams and architectures described herein may be varied according to the skill of one of ordinary skill in the art. Furthermore, the echo cancellation filters described here utilize a finite impulse response filter, however other filters might be used, for example infinite impulse response filters.

What is claimed:

1. A dual-port audio product implementing a selective mixing feature, comprising:
  a first communication port configured to receive and transmit far-side audio data to a distant party, wherein said first communication port is operable in a full-duplex mode;
  a second communication port configured to receive audio data, said second port optionally configured to transmit audio data to another distant party;
  a first mixer receiving audio data from said first and second communication ports, wherein said first mixer is configured to mix the audio received from said first and second communication ports;
  a sound producing circuit receiving an audio signal from said first mixer, wherein said sound producing circuit and said first mixer are configured to produce an audible sound corresponding to a mixed signal of the audio data received from said first and second communication ports;
  a microphone circuit configured to receive audible sound, said microphone circuit further configured to convert said audible sounds to an audio signal;

a far-side frequency decomposer operable to decompose the far-side audio data received from said first communication port;

a microphone frequency decomposer operable to decompose the audio data received at said microphone circuit into a number of frequency bands, an acoustic echo canceller receiving the audio signal produced by said microphone circuit and a mixed audio signal mixed from the audio data received at said first and second communication ports, wherein said echo canceller is operable to apply an echo cancellation fitter to the mixed audio signal to generate an echo cancelled signal, wherein the echo signal corresponding to the audio signal between said sound producing circuit and said microphone circuit is attenuated in the echo cancelled signal;

a second mixer configured to receive the echo cancelled signal produced from said echo canceller and audio data from said second communication port, wherein said second mixer is operable to mix the echo cancelled signal and an incoming audio data from said second communication port into an outgoing audio signal to said first communication port;

a switch interposed between said second communication port and said second mixer, wherein said switch may be configured to pass or block the incoming audio data from said second communication port, further wherein where said switch is configured to pass audio data said second mixer operates to mix the audio data from said second communication port and the echo cancelled signal, further wherein where said switch is configured to block audio data said second mixer operates to pass only the echo cancelled signal to said first communication port and not the audio signal received at said second communication port;

an audio subsystem that implements doubletalk detection and recovery using information received from said frequency decomposers; and a control input for said switch, whereby the operation of said product can be selected between mix mode and non-mix mode;

wherein the echo cancelled signal is provided to said first communication port without mixing the audio received from said second audio port, such that the conversational distant party does not hear the audio signal received at said second communication port because it is not mixed in the outgoing signal of said first port and that signal is echo cancelled by said acoustic echo canceller.

2. The claim of claim 1, wherein said echo canceller cancels the incoming signal from both of said first and second communication ports produced at said sound producing circuit.

3. The claim of claim 1, wherein said second communication port is configured to transmit audio data to a distant party, further comprising:

a third mixer configured to receive the echo cancelled signal produced from said echo canceller and audio data from said first communication port, wherein said third mixer is operable to mix the echo cancelled signal and the incoming audio data from said first communication port into an outgoing audio signal to said second communication port;

a second switch interposed between said first communication port and said third mixer, wherein said second switch is configured to pass or block the incoming audio data from said first communication port, wherein where said second switch is configured to pass audio data said third mixer operates to mix the audio data from said first communication port and the echo cancelled signal, further where said second switch is configured to block audio data said third mixer operates to pass only the echo cancelled signal to said second communication port and not the audio signal received at said first communication port; and a second control input for said second switch, whereby the operation of said product can be selected between mix mode and non-mix mode for audio directed from said first communication port to said second communication port.

4. The claim of claim 3, wherein said first and second control inputs are implemented as a common control input controlling the passage of audio such that either audio will be fully passed between said first and said second communication ports or audio will not be directly passed between said first and second communication ports.

5. The claim of claim 3, wherein:

said first and second control inputs are implemented as a common control input;

said first and second switches are implemented as a common switch, such that neither is independently controllable from the other; and wherein said common inputs and switches control the passage of audio such that either audio will be fully passed between said first and said second communication ports or audio will not be directly passed between said first and second communication ports.

6. A method to manufacture a dual-port audio product implementing a selective mixing feature, comprising:

providing a first communication port configured to receive and transmit far-side audio data to a distant party, wherein said first communication port is operable in a full-duplex mode;

providing a second communication port configured to receive audio data, said second port optionally configured to transmit audio data to another distant party;

coupling a first mixer to said first and second communication ports, said first mixer receiving audio data from said first and second communication ports, wherein said first mixer is configured to mix the audio received from said first and second communication ports;

coupling a sound producing circuit to said first mixer, said sound producing circuit receiving an audio signal from said first mixer, wherein said sound producing circuit and said first mixer are configured to produce an audible sound corresponding to a mixed signal of the audio data received from said first and second communication ports;

providing a microphone circuit configured to receive audible sounds, said microphone circuit further configured to convert said audible sounds to an audio signal;

providing a far-side frequency decomposer operable to decompose the far-side audio data received from said first communication port;

providing a microphone frequency decomposer operable to decompose the audio data received at said microphone circuit into a number of frequency bands;

providing an acoustic echo canceller receiving the audio signal produced by said microphone circuit and a mixed audio signal mixed from the audio data received at said first and second communication ports, wherein said echo canceller is operable to apply an echo cancellation filter to the mixed audio signal to generate an echo cancelled signal; wherein the echo signal corresponding to the audio signal between said sound producing circuit and said microphone circuit is attenuated in the echo cancelled signal, providing a second mixer configured to receive the echo cancelled signal produced from said echo canceller and audio data from said second communication port, wherein said second mixer is operable to mix the echo cancelled signal and an incoming audio data from said second communication port into an outgoing audio signal to said first communication port;

providing a switch interposed between said second communication port and said second mixer, wherein said switch may be configured to pass or block the incoming audio data from said second communication port, further wherein where said switch is configured to pass audio data said second mixer operates to mix the audio data from said second communication port and the echo cancelled signal, further wherein where said switch is configured to block audio data said second mixer operates to pass only the echo cancelled signal to said first communication port and not the audio signal received at said second communication port;

providing an audio subsystem that implements doubletalk detection and recovery using information received from said frequency decomposers; and providing a control input for said switch, whereby the operation of said product can be selected between mix mode and non-mix mode;

wherein the echo cancelled signal is provided to said first communication port without mixing the audio received from said second audio port, such that the conversational distant party does not hear the audio signal received at said second communication port because it is not mixed in the outgoing signal of said first port and that signal is echo cancelled by said acoustic echo canceller.

7. The claim of claim 6 wherein said echo canceller cancels the incoming signal from both of said first and second communication ports produced at said sound producing circuit.

8. The claim of claim 6 wherein said second communication port is configured to transmit audio data to a distant party, further comprising:

a third mixer configured to receive the echo cancelled signal produced from said echo canceller and audio data from said first communication port, wherein said third mixer is operable to mix the echo cancelled signal and the incoming audio data from said first communication port into an outgoing audio signal to said second communication port;

a second switch interposed between said first communication port and said third mixer, wherein said second switch is configured to pass or block the incoming audio data from said first communication port, wherein where said second switch is configured to pass audio data said third mixer operates to mix the audio data from said first communication port and the echo cancelled signal, further where said second switch is configured to block audio data said third mixer operates to pass only the echo cancelled signal to said second communication port and not the audio signal received at said first communication port; and a second control input for said second switch, whereby the operation of said product can be selected between mix mode and non-mix mode for audio directed from said first communication port to said second communication port.

9. The claim of claim 8 wherein said first and second control inputs are implemented as a common control input controlling the passage of audio such that either audio will be fully passed between said first and said second communication ports or audio will not be directly passed between said first and second communication ports.

10. The claim of claim 8, wherein:

said first and second control inputs are implemented as a common control input;

said first and second switches are implemented as a common switch, such that neither is independently controllable from the other; and wherein said common inputs and switches control the passage of audio such that either audio will be fully passed between said first and said second communication ports or audio will not be directly passed between said first and second communication ports.

11. A method to use a dual-port audio product implementing a selective mixing feature, comprising:

configuring a first communication port to receive and transmit far-side audio data to a distant party, wherein said first communication port is operable in a full-duplex mode;

configuring a second communication port to receive audio data, said second port optionally configured to transmit audio data to another distant party;

receiving audio data with a first mixer from said first and second communication ports, wherein said first mixer is configured to mix the audio received from said first and second communication ports;

receiving an audio signal from said first mixer with a sound producing circuit, wherein said sound producing circuit and said first mixer are configured to produce an audible sound corresponding to a mixed signal of the audio data received from said first and second communication ports;

configuring a microphone circuit to receive audible sounds, said microphone circuit further configured to convert said audible sounds to an audio signal;

decomposing the far-side audio data received from said first communication port with a far-side frequency decomposer;

decomposing the audio data received at said microphone circuit into a number of frequency bands with a microphone frequency decomposer;

receiving the audio signal produced by said microphone circuit and a mixed audio signal mixed from the audio data received at said first and second communication ports with an acoustic echo canceller, wherein said echo canceller is operable to apply an echo cancellation fitter to the mixed audio signal to generate an echo cancelled signal; wherein the echo signal corresponding to the audio signal between said sound producing circuit and said microphone circuit is attenuated in the echo cancelled signal;

configuring a second mixer to receive the echo cancelled signal produced from said echo canceller and audio data from said second communication port, wherein said second mixer is operable to mix the echo cancelled signal and an incoming audio data from said second communication port into an outgoing audio signal to said first communication port;

providing a switch interposed between said second communication port and said second mixer, wherein said switch may be configured to pass or block the incoming audio data from said second communication port, further wherein where said switch is configured to pass audio data said second mixer operates to mix the audio data from said second communication port and the echo cancelled signal, further wherein where said switch is configured to block audio data said second mixer operates to pass only the echo cancelled signal to said first communication port and not the audio signal received at said second communication port;

implementing doubletalk detection and recovery using information received from said frequency decomposers with an audio subsystem; and providing a control input for said switch, whereby the operation of said product can be selected between mix mode and non-mix mode;

wherein the echo cancelled signal is provided to said first communication port without mixing the audio received from said second audio port, such that the conversational distant party does not hear the audio signal received at said second communication port because it is not mixed in the outgoing signal of said first port and that signal is echo cancelled by said acoustic echo canceller.

12. The claim of claim 11 wherein said echo canceller cancels the incoming signal from both of said first and second communication ports produced at said sound producing circuit.

13. The claim of claim 11 wherein said second communication port is configured to transmit audio data to a distant party, further comprising:

a third mixer configured to receive the echo cancelled signal produced from said echo canceller and audio data from said first communication port, wherein said third mixer is operable to mix the echo cancelled signal and the incoming audio data from said first communication port into an outgoing audio signal to said second communication port;

a second switch interposed between said first communication port and said third mixer, wherein said second switch is configured to pass or block the incoming audio data from said first communication port, wherein where said second switch is configured to pass audio data said third mixer operates to mix the audio data from said first communication port and the echo cancelled signal, further where said second switch is configured to block audio data said third mixer operates to pass only the echo cancelled signal to said second communication port and not the audio signal received at said first communication port; and a second control input for said second switch, whereby the operation of said product can be selected between mix mode and non-mix mode for audio directed from said first communication port to said second communication port.

14. The claim of claim 13 wherein said first and second control inputs are implemented as a common control input controlling the passage of audio such that either audio will be fully passed between said first and said second communication ports or audio will not be directly passed between said first and second communication ports.

15. The claim of claim 13, wherein:

said first and second control inputs are implemented as a common control input;

said first and second switches are implemented as a common switch, such that neither is independently controllable from the other; and wherein said common inputs and switches control the passage of audio such that either audio will be fully passed between said first and said second communication ports or audio will not be directly passed between said first and second communication ports.

\* \* \* \* \*

UNITED STATES PATENT AND TRADEMARK OFFICE
CERTIFICATE OF CORRECTION

PATENT NO. : 8,077,857 B1
APPLICATION NO. : 11/686280
DATED : December 13, 2011
INVENTOR(S) : David Lambert Page 1 of 1

It is certified that error appears in the above-identified patent and that said Letters Patent is hereby corrected as shown below:

In column 2, line 52, delete "echos" and insert -- echoes --, therefor.

In column 11, line 53, delete "echos" and insert -- echoes --, therefor.

In column 16, line 1, delete "VoIP" and insert --VOIP --, therefor.

In column 16, line 65, in claim 1, delete "sound," and insert -- sounds, --, therefor.

In column 17, line 6, in claim 1, delete "bands," and insert -- bands; --, therefor.

In column 17, line 11, in claim 1, delete "fitter" and insert -- filter --, therefor.

In column 17, line 13, in claim 1, delete "signal," and insert -- signal; --, therefor.

In column 19, line 3, in claim 6, delete "signal," and insert -- signal; --, therefor.

In column 20, line 48, in claim 11, delete "fitter" and insert -- filter --, therefor.

Signed and Sealed this
Sixth Day of March, 2012

David J. Kappos
*Director of the United States Patent and Trademark Office*